US012245634B2

(12) United States Patent
Blandino et al.

(10) Patent No.: US 12,245,634 B2
(45) Date of Patent: Mar. 11, 2025

(54) ARTICLE FOR USE WITH APPARATUS FOR HEATING SMOKABLE MATERIAL

(71) Applicant: NICOVENTURES TRADING LIMITED, London (GB)

(72) Inventors: Thomas P. Blandino, Cottage Grove, WI (US); Andrew P. Wilke, Madison, WI (US); James J. Frater, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 18/181,444

(22) Filed: Mar. 9, 2023

(65) Prior Publication Data

US 2023/0276853 A1 Sep. 7, 2023

Related U.S. Application Data

(60) Division of application No. 15/772,399, filed as application No. PCT/EP2016/075735 on Oct. 26, (Continued)

(51) Int. Cl.
*A24F 40/465* (2020.01)
*A24B 15/16* (2020.01)
(Continued)

(52) U.S. Cl.
CPC .......... *A24F 40/465* (2020.01); *A24B 15/165* (2013.01); *A24D 1/20* (2020.01);
(Continued)

(58) Field of Classification Search
None
See application file for complete search history.

(56) References Cited

U.S. PATENT DOCUMENTS 2,592,554 A 4/1952 Frankenburg
2,860,638 A 11/1958 Frank
(Continued)

FOREIGN PATENT DOCUMENTS

AU 2014369867 A1 6/2016
AU 2017289114 B2 4/2020
(Continued)

OTHER PUBLICATIONS

"Australian Examination Report for AU Application No. 2016313708, dated Nov. 1, 2019".
(Continued)

*Primary Examiner* — Thor S Campbell
(74) *Attorney, Agent, or Firm* — Husch Blackwell

(57) ABSTRACT

Disclosed is an article for use with apparatus for heating smokable material to volatilize at least one component of the smokable material. The article includes smokable material, and a film defining a closed circuit of heating material. The heating material is heatable by penetration with a varying magnetic field to heat the smokable material. Also disclosed is apparatus for heating smokable material to volatilize at least one component of the smokable material. The apparatus includes a magnetic field generator for generating a varying magnetic field for use in heating the smokable material. The magnetic field generator includes a film defining a coil of electrically conductive material, and a device for passing a varying electrical current through the coil.

4 Claims, 4 Drawing Sheets

Related U.S. Application Data

2016, now Pat. No. 11,805,818, which is a continuation of application No. 14/927,556, filed on Oct. 30, 2015, now abandoned.

(51) Int. Cl.

| | |
|---|---|
| ***A24D 1/20*** | (2020.01) |
| ***A24F 40/70*** | (2020.01) |
| ***B41F 17/00*** | (2006.01) |
| ***H01F 41/04*** | (2006.01) |
| ***H05B 3/00*** | (2006.01) |
| ***H05B 3/34*** | (2006.01) |
| ***H05B 6/36*** | (2006.01) |
| *A24F 40/20* | (2020.01) |

(52) U.S. Cl.

CPC .............. *A24F 40/70* (2020.01); *B41F 17/00* (2013.01); *H01F 41/041* (2013.01); *H05B 3/0014* (2013.01); *H05B 3/34* (2013.01); *H05B 6/36* (2013.01); *A24F 40/20* (2020.01)

(56) References Cited

U.S. PATENT DOCUMENTS

| | | | | |
|---|---|---|---|---|
| 3,065,756 | A | 11/1962 | Noel | |
| 3,144,174 | A * | 8/1964 | Abplanalp | B65D 83/72 222/146.2 |
| 3,173,612 | A | 3/1965 | Gut | |
| 3,517,151 | A | 6/1970 | Mekjean | |
| 3,596,034 | A | 7/1971 | Mekjean | |
| 4,149,548 | A | 4/1979 | Bradshaw | |
| 4,913,168 | A | 4/1990 | Potter et al. | |
| 4,944,317 | A | 7/1990 | Thal | |
| 5,093,894 | A | 3/1992 | Deevi et al. | |
| 5,144,962 | A | 9/1992 | Counts et al. | |
| 5,317,132 | A | 5/1994 | Clough et al. | |
| 5,369,249 | A * | 11/1994 | Kwon | H05B 6/1245 336/232 |
| 5,613,505 | A * | 3/1997 | Campbell | H05B 6/365 131/194 |
| 5,649,554 | A * | 7/1997 | Sprinkel | A24F 40/465 131/194 |
| 6,053,176 | A | 4/2000 | Adams et al. | |
| 6,632,407 | B1 | 10/2003 | Lau et al. | |
| 6,803,550 | B2 * | 10/2004 | Sharpe | H05B 6/105 219/635 |
| 7,185,659 | B2 * | 3/2007 | Sharpe | A24F 40/85 131/194 |
| 7,185,959 | B2 | 3/2007 | Mueller et al. | |
| 7,810,505 | B2 | 10/2010 | Yang | |
| 8,459,271 | B2 * | 6/2013 | Inagaki | A61M 11/041 131/335 |
| 8,807,140 | B1 | 8/2014 | Scatterday | |
| 8,910,640 | B2 * | 12/2014 | Sears | F22B 1/28 131/194 |
| 8,968,848 | B2 * | 3/2015 | Quella | H01Q 1/2225 428/35.9 |
| 9,357,803 | B2 | 6/2016 | Egoyants et al. | |
| 9,554,598 | B2 | 1/2017 | Egoyants et al. | |
| 9,710,921 | B2 | 7/2017 | Wong et al. | |
| 9,980,512 | B2 * | 5/2018 | Collett | A24F 40/42 |
| 10,058,123 | B2 | 8/2018 | Taluskie et al. | |
| 10,420,372 | B2 | 9/2019 | Suzuki et al. | |
| 10,524,508 | B2 * | 1/2020 | Sur | H02M 7/53871 |
| 11,363,682 | B2 * | 6/2022 | Mironov | A24F 40/50 |
| 2002/0005207 | A1 | 1/2002 | Wrenn et al. | |
| 2002/0038799 | A1 * | 4/2002 | Laken | B29C 66/91221 219/535 |
| 2002/0038800 | A1 * | 4/2002 | Laken | B29C 53/04 219/535 |
| 2002/0078951 | A1 | 6/2002 | Nichols et al. | |
| 2002/0078956 | A1 * | 6/2002 | Sharpe | A61M 11/042 128/203.26 |
| 2003/0007887 | A1 * | 1/2003 | Roumpos | A61L 9/02 422/126 |
| 2003/0102304 | A1 * | 6/2003 | Boyers | C03C 23/00 219/628 |
| 2003/0230567 | A1 * | 12/2003 | Centanni | F22B 1/282 219/628 |
| 2004/0149297 | A1 | 8/2004 | Sharpe | |
| 2004/0188418 | A1 * | 9/2004 | Aisenbrey | B29C 45/0013 219/535 |
| 2005/0025213 | A1 * | 2/2005 | Parks | H05B 6/103 219/214 |
| 2005/0045193 | A1 | 3/2005 | Yang | |
| 2007/0267409 | A1 | 11/2007 | Gard et al. | |
| 2009/0120928 | A1 * | 5/2009 | Lee | H05B 6/062 219/626 |
| 2009/0151717 | A1 | 6/2009 | Bowen et al. | |
| 2009/0293888 | A1 | 12/2009 | Williams et al. | |
| 2010/0024834 | A1 | 2/2010 | Oglesby et al. | |
| 2010/0181387 | A1 | 7/2010 | Zaffaroni et al. | |
| 2011/0240022 | A1 * | 10/2011 | Hodges | A61K 31/4468 128/200.14 |
| 2011/0271971 | A1 | 11/2011 | Conner et al. | |
| 2012/0145703 | A1 | 6/2012 | Matsen et al. | |
| 2012/0214926 | A1 | 8/2012 | Berthold et al. | |
| 2012/0234315 | A1 * | 9/2012 | Li | A61M 15/06 128/200.21 |
| 2012/0305545 | A1 * | 12/2012 | Brosnan | H05B 6/065 219/622 |
| 2013/0030125 | A1 | 1/2013 | Buryak et al. | |
| 2013/0133675 | A1 * | 5/2013 | Shinozaki | A24D 1/22 131/329 |
| 2013/0160780 | A1 | 6/2013 | Matsumoto et al. | |
| 2014/0060554 | A1 | 3/2014 | Collett et al. | |
| 2014/0096782 | A1 | 4/2014 | Ampolini et al. | |
| 2014/0158144 | A1 | 6/2014 | Kaljura et al. | |
| 2014/0216485 | A1 | 8/2014 | Egoyants et al. | |
| 2014/0224267 | A1 | 8/2014 | Levitz et al. | |
| 2014/0301721 | A1 | 10/2014 | Ruscio et al. | |
| 2015/0040925 | A1 | 2/2015 | Saleem et al. | |
| 2015/0043123 | A1 * | 2/2015 | Cox | H01L 21/6833 29/611 |
| 2015/0181937 | A1 | 7/2015 | Dubief et al. | |
| 2015/0201670 | A1 | 7/2015 | Crooks et al. | |
| 2015/0201675 | A1 | 7/2015 | Lord | |
| 2015/0237913 | A1 | 8/2015 | Suzuki et al. | |
| 2015/0245669 | A1 | 9/2015 | Cadieux et al. | |
| 2015/0260047 | A1 * | 9/2015 | Gieras | H05B 1/0236 416/95 |
| 2015/0272219 | A1 | 10/2015 | Hatrick et al. | |
| 2015/0335062 | A1 | 11/2015 | Shinkawa et al. | |
| 2016/0007652 | A1 | 1/2016 | Taluskie et al. | |
| 2016/0012022 | A1 | 1/2016 | Lim | |
| 2016/0120221 | A1 * | 5/2016 | Mironov | A24F 40/42 392/395 |
| 2016/0150825 | A1 | 6/2016 | Mironov et al. | |
| 2016/0192708 | A1 | 7/2016 | Demeritt et al. | |
| 2016/0324215 | A1 | 11/2016 | Mironov et al. | |
| 2016/0331031 | A1 | 11/2016 | Malgat et al. | |
| 2017/0055574 | A1 | 3/2017 | Kaufman et al. | |
| 2017/0055575 | A1 | 3/2017 | Wilke et al. | |
| 2017/0055580 | A1 | 3/2017 | Blandino et al. | |
| 2017/0055581 | A1 | 3/2017 | Wilke et al. | |
| 2017/0055582 | A1 | 3/2017 | Blandino et al. | |
| 2017/0055583 | A1 | 3/2017 | Blandino et al. | |
| 2017/0055584 | A1 | 3/2017 | Blandino et al. | |
| 2017/0055585 | A1 | 3/2017 | Fursa et al. | |
| 2017/0071250 | A1 | 3/2017 | Mironov et al. | |
| 2017/0095006 | A1 | 4/2017 | Egoyants et al. | |
| 2017/0119046 | A1 | 5/2017 | Kaufman et al. | |
| 2017/0119047 | A1 | 5/2017 | Blandino et al. | |
| 2017/0119048 | A1 | 5/2017 | Kaufman et al. | |
| 2017/0119049 | A1 | 5/2017 | Blandino et al. | |
| 2017/0119050 | A1 | 5/2017 | Blandino et al. | |
| 2017/0119051 | A1 | 5/2017 | Blandino et al. | |
| 2017/0156403 | A1 | 6/2017 | Gill et al. | |
| 2017/0174418 | A1 | 6/2017 | Cai | |
| 2017/0199048 | A1 | 7/2017 | Igumnov et al. | |
| 2017/0224015 | A1 | 8/2017 | Basil et al. | |

(56) References Cited

U.S. PATENT DOCUMENTS

| | | | |
|---|---|---|---|
| 2017/0251718 | A1 | 9/2017 | Armoush et al. |
| 2017/0325506 | A1 | 11/2017 | Batista |
| 2018/0228217 | A1 | 8/2018 | Mironov et al. |
| 2018/0235279 | A1 | 8/2018 | Wilke et al. |
| 2018/0242633 | A1 | 8/2018 | Wilke et al. |
| 2018/0242636 | A1 | 8/2018 | Blandino et al. |
| 2018/0279677 | A1 | 10/2018 | Blandino et al. |
| 2018/0317552 | A1 | 11/2018 | Kaufman et al. |
| 2018/0317553 | A1 | 11/2018 | Blandino et al. |
| 2018/0317555 | A1* | 11/2018 | Blandino ............. A24B 15/165 |
| 2018/0325173 | A1 | 11/2018 | Blandino et al. |
| 2018/0360123 | A1 | 12/2018 | Silvestrini |
| 2019/0159517 | A1 | 5/2019 | Ballesteros Gomez et al. |
| 2019/0191780 | A1 | 6/2019 | Wilke et al. |
| 2019/0230988 | A1 | 8/2019 | Aoun |
| 2019/0239555 | A1 | 8/2019 | Nicholson |
| 2020/0054068 | A1 | 2/2020 | Blandino et al. |
| 2020/0054069 | A1 | 2/2020 | Blandino et al. |
| 2020/0229497 | A1 | 7/2020 | Aoun et al. |
| 2020/0268053 | A1 | 8/2020 | Thorsen et al. |
| 2020/0288774 | A1 | 9/2020 | Blandino et al. |
| 2021/0100281 | A1 | 4/2021 | Abi Aoun et al. |
| 2022/0015408 | A1 | 1/2022 | Blandino et al. |

FOREIGN PATENT DOCUMENTS

| | | | |
|---|---|---|---|
| CA | 2003521 | A1 | 5/1990 |
| CA | 2003522 | A1 | 5/1990 |
| CA | 2937722 | A1 | 11/2015 |
| CA | 2974770 | A1 | 12/2015 |
| CA | 2982164 | A1 | 10/2016 |
| CA | 3002424 | A1 | 4/2017 |
| CN | 1126426 | A | 7/1996 |
| CN | 2393205 | Y | 8/2000 |
| CN | 2738167 | Y | 11/2005 |
| CN | 2924411 | Y | 7/2007 |
| CN | 101084801 | A | 12/2007 |
| CN | 201076006 | Y | 6/2008 |
| CN | 201088138 | Y | 7/2008 |
| CN | 101277623 | A | 10/2008 |
| CN | 101326138 | A | 12/2008 |
| CN | 101390659 | A | 3/2009 |
| CN | 201199922 | Y | 3/2009 |
| CN | 101951796 | A | 1/2011 |
| CN | 201762288 | U | 3/2011 |
| CN | 101326138 | B | 1/2013 |
| CN | 103202540 | A | 7/2013 |
| CN | 203369386 | U | 1/2014 |
| CN | 203435685 | U | 2/2014 |
| CN | 103689812 | A | 4/2014 |
| CN | 203735483 | U | 7/2014 |
| CN | 103988576 | A | 8/2014 |
| CN | 203748687 | U | 8/2014 |
| CN | 203762288 | U | 8/2014 |
| CN | 104013109 | A | 9/2014 |
| CN | 104095291 | A | 10/2014 |
| CN | 104256899 | A | 1/2015 |
| CN | 204091003 | U | 1/2015 |
| CN | 104365175 | A | 2/2015 |
| CN | 104470387 | A | 3/2015 |
| CN | 104480800 | A | 4/2015 |
| CN | 104619202 | A | 5/2015 |
| CN | 104664608 | A | 6/2015 |
| CN | 104768407 | A | 7/2015 |
| CN | 204519366 | U | 8/2015 |
| CN | 204539505 | U | 8/2015 |
| CN | 204599333 | U | 9/2015 |
| CN | 104994757 | A | 10/2015 |
| CN | 105188425 | A | 12/2015 |
| CN | 105682488 | A | 6/2016 |
| CN | 104095291 | B | 1/2017 |
| EA | 009116 | B1 | 10/2007 |
| EP | 0430559 | A2 | 6/1991 |
| EP | 0430566 | A2 | 6/1991 |
| EP | 0488488 | A1 | 6/1992 |
| EP | 0703735 | A1 | 4/1996 |
| EP | 0703735 | B1 | 7/2001 |
| EP | 1357025 | A2 | 10/2003 |
| EP | 1454840 | A1 | 9/2004 |
| EP | 1454840 | B1 | 9/2006 |
| EP | 1940254 | A2 | 7/2008 |
| EP | 2059091 | A2 | 5/2009 |
| EP | 1357025 | B1 | 7/2009 |
| EP | 2186833 | A1 | 5/2010 |
| EP | 2316286 | A1 | 5/2011 |
| EP | 2327318 | A1 | 6/2011 |
| EP | 2444112 | A1 | 4/2012 |
| EP | 2253541 | B1 | 5/2012 |
| EP | 2460424 | A1 | 6/2012 |
| EP | 2903552 | A1 | 8/2015 |
| EP | 2907397 | A1 | 8/2015 |
| EP | 3367823 | A2 | 9/2018 |
| EP | 3542747 | A1 | 9/2019 |
| EP | 3632244 | A1 | 4/2020 |
| GB | 347650 | A | 4/1931 |
| GB | 2495923 | A | 5/2013 |
| GB | 2504732 | A | 2/2014 |
| GB | 2504733 | A | 2/2014 |
| JP | S457120 | Y1 | 4/1970 |
| JP | H03113366 | A | 5/1991 |
| JP | H0556298 | U | 7/1993 |
| JP | H07502188 | A | 3/1995 |
| JP | H0850422 | A | 2/1996 |
| JP | H0851175 | A | 2/1996 |
| JP | H08511175 | A | 11/1996 |
| JP | H09509845 | A | 10/1997 |
| JP | 2001174054 | A | 6/2001 |
| JP | 2002043047 | A | 2/2002 |
| JP | 2002144451 | A | 5/2002 |
| JP | 2002252078 | A | 9/2002 |
| JP | 2004121594 | A | 4/2004 |
| JP | 2004331191 | A | 11/2004 |
| JP | 2008050422 | A | 3/2008 |
| JP | 2008511175 | A | 4/2008 |
| JP | 2009087703 | A | 4/2009 |
| JP | 2010022754 | A | 2/2010 |
| JP | 2010050834 | A | 3/2010 |
| JP | 2010508034 | A | 3/2010 |
| JP | 2013013441 | A | 1/2013 |
| JP | 2013515465 | A | 5/2013 |
| JP | 2015524261 | A | 8/2015 |
| JP | 2015531601 | A | 11/2015 |
| JP | 2016508744 | A | 3/2016 |
| JP | 2016516402 | A | 6/2016 |
| JP | 2016538842 | A | 12/2016 |
| JP | 6077145 | B2 | 2/2017 |
| JP | 2017515490 | A | 6/2017 |
| JP | 2017526381 | A | 9/2017 |
| JP | 2020512487 | A | 4/2020 |
| JP | 6875044 | B2 | 5/2021 |
| JP | 6933323 | B2 | 9/2021 |
| JP | 7105289 | B2 | 7/2022 |
| KR | 880701636 | A | 11/1988 |
| KR | 100385395 | B1 | 8/2003 |
| KR | 100449444 | B1 | 8/2005 |
| KR | 20100108565 | A | 10/2010 |
| KR | 20130029697 | A | 3/2013 |
| KR | 20140093659 | A | 7/2014 |
| KR | 20150027069 | A | 3/2015 |
| KR | 20150040012 | A | 4/2015 |
| KR | 20150047616 | A | 5/2015 |
| KR | 20150132112 | A | 11/2015 |
| KR | 20150143877 | A | 12/2015 |
| KR | 20160064159 | A | 6/2016 |
| KR | 20170008209 | A | 1/2017 |
| RU | 2132629 | C1 | 7/1999 |
| RU | 2135054 | C1 | 8/1999 |
| RU | 103281 | U1 | 4/2011 |
| RU | 2425608 | C2 | 8/2011 |
| RU | 2509516 | C2 | 3/2014 |
| RU | 2531890 | C2 | 10/2014 |
| RU | 2015106592 | A | 11/2016 |
| RU | 2682772 | C1 | 3/2019 |
| UA | 125609 | C2 | 5/2022 |

(56) References Cited

FOREIGN PATENT DOCUMENTS

| | | | |
|---|---|---|---|
| WO | 8404698 | A1 | 12/1984 |
| WO | 9409842 | A1 | 5/1994 |
| WO | 9527411 | A1 | 10/1995 |
| WO | 9527412 | A1 | 10/1995 |
| WO | 9618662 | A1 | 6/1996 |
| WO | 02089532 | A1 | 11/2002 |
| WO | 02098389 | A1 | 12/2002 |
| WO | 2007051163 | A2 | 5/2007 |
| WO | 2008015441 | A1 | 2/2008 |
| WO | 2009079641 | A2 | 6/2009 |
| WO | 2010113702 | A1 | 10/2010 |
| WO | 2010133342 | A1 | 11/2010 |
| WO | 2011130414 | A1 | 10/2011 |
| WO | 2012134117 | A2 | 10/2012 |
| WO | 2012164009 | A2 | 12/2012 |
| WO | 2013034459 | A1 | 3/2013 |
| WO | 2013098395 | A1 | 7/2013 |
| WO | 2013098409 | A1 | 7/2013 |
| WO | 2013131763 | A1 | 9/2013 |
| WO | 2013131764 | A1 | 9/2013 |
| WO | 2013144324 | A1 | 10/2013 |
| WO | 2013178766 | A1 | 12/2013 |
| WO | 2014023965 | A1 | 2/2014 |
| WO | 2014023967 | A1 | 2/2014 |
| WO | 2014048745 | A1 | 4/2014 |
| WO | 2014054035 | A1 | 4/2014 |
| WO | 2014061477 | A1 | 4/2014 |
| WO | 2014102092 | A1 | 7/2014 |
| WO | 2014104078 | A1 | 7/2014 |
| WO | 2014139611 | A1 | 9/2014 |
| WO | 2014140320 | A1 | 9/2014 |
| WO | 2015019101 | A1 | 2/2015 |
| WO | 2015062983 | A2 | 5/2015 |
| WO | 2015071682 | A1 | 5/2015 |
| WO | 2015082648 | A1 | 6/2015 |
| WO | 2015082649 | A1 | 6/2015 |
| WO | 2015082651 | A1 | 6/2015 |
| WO | 2015082652 | A1 | 6/2015 |
| WO | 2015082653 | A1 | 6/2015 |
| WO | 2015100361 | A1 | 7/2015 |
| WO | 2015101479 | A1 | 7/2015 |
| WO | 2015116934 | A1 | 8/2015 |
| WO | 2015117701 | A1 | 8/2015 |
| WO | 2015117702 | A1 | 8/2015 |
| WO | 2015131058 | A1 | 9/2015 |
| WO | 2015155289 | A1 | 10/2015 |
| WO | 2015166245 | A2 | 11/2015 |
| WO | 2015175568 | A1 | 11/2015 |
| WO | 2015176898 | A1 | 11/2015 |
| WO | 2015177043 | A1 | 11/2015 |
| WO | 2015177044 | A1 | 11/2015 |
| WO | 2015177045 | A1 | 11/2015 |
| WO | 2015177046 | A1 | 11/2015 |
| WO | 2015177247 | A1 | 11/2015 |
| WO | 2015177253 | A1 | 11/2015 |
| WO | 2015177255 | A1 | 11/2015 |
| WO | 2015177257 | A1 | 11/2015 |
| WO | 2015177264 | A1 | 11/2015 |
| WO | 2015177294 | A1 | 11/2015 |
| WO | 2015197863 | A1 | 12/2015 |
| WO | 2015198015 | A1 | 12/2015 |
| WO | 2016023965 | A1 | 2/2016 |
| WO | 2016075426 | A1 | 5/2016 |
| WO | 2016075436 | A1 | 5/2016 |
| WO | 2016088037 | A1 | 6/2016 |
| WO | 2016096865 | A2 | 6/2016 |
| WO | 2016162446 | A1 | 10/2016 |
| WO | 2016207407 | A1 | 12/2016 |
| WO | 2017005705 | A1 | 1/2017 |
| WO | 2017029269 | A1 | 2/2017 |
| WO | 2017036950 | A2 | 3/2017 |
| WO | 2017036951 | A1 | 3/2017 |
| WO | 2017036954 | A1 | 3/2017 |
| WO | 2017036955 | A2 | 3/2017 |
| WO | 2017036957 | A1 | 3/2017 |
| WO | 2017036958 | A2 | 3/2017 |
| WO | 2017036959 | A1 | 3/2017 |
| WO | 2017036958 | A3 | 4/2017 |
| WO | 2017068098 | A1 | 4/2017 |
| WO | 2017072145 | A1 | 5/2017 |
| WO | 2017072146 | A1 | 5/2017 |
| WO | 2017072147 | A2 | 5/2017 |
| WO | 2017072148 | A1 | 5/2017 |
| WO | 2017072149 | A1 | 5/2017 |
| WO | 2017072147 | A3 | 7/2017 |
| WO | 2017167932 | A2 | 10/2017 |
| WO | 2018002085 | A1 | 1/2018 |

OTHER PUBLICATIONS

"Australian Examination Report, Application No. 2016313708, dated Nov. 23, 2018".

"Brazilian Office Action for BR Application No. BR1120180085138, dated Dec. 11, 2019".

"Canadian Office Action for CA Application No. 3003521, dated Dec. 9, 2019".

"Canadian Office Action, Application No. 2,996,341, dated Mar. 1, 2019".

"Canadian Office Action, Application No. 3,003,520, dated Mar. 28, 2019".

"Chinese Office Action for CN Application No. 201680049091.5, dated Dec. 27, 2019".

"Chinese Office Action, Application No. 201680049091.5, mailed Aug. 14, 2020".

"Communication pursuant to Article 94(3) EPC for Application No. 16798648.8, mailed on Nov. 19, 2020".

"Communication pursuant to Article 94(3) EPC for Application No. 17740628.7 mailed on May 9, 2022".

"Communication pursuant to Article 94(3) EPC for Application No. 17740631.1 mailed on Oct. 18, 2022".

"Decision of Refusal received for Japanese Patent Application No. 2020-191838, mailed on Feb. 28, 2023".

"Decision to Grant a Patent mailed Mar. 15, 2022 for Japanese Application No. 2020-183062".

"European Office Action for Application No. 21213373.0, mailed on May 9, 2022".

"European Search Report for Application No. 21213373.0, mailed on Apr. 26, 2022".

"European Search Report for European Application No. 20205063.9, mailed on Feb. 18, 2021".

"Examination Report mailed Sep. 6, 2019 for Australian Application No. 2017289114".

"Examination Report No. 1 for Australian Patent Application No. 2018334042 dated Dec. 16, 2020".

"Extended European Search Report for Application No. 20202666.2, mailed on Feb. 19, 2021".

"Extended European Search Report for Application No. 20204770.0, mailed on Jun. 30, 2021".

"Extended European Search Report for Application No. 20205060.5, mailed on Mar. 2, 2021".

"Extended European Search Report for Application No. 20205060.5, mailed on Aug. 6, 2021".

"Extended European Search Report for Application No. 20205065.4, mailed on Mar. 10, 2021".

"Extended European Search Report for Application No. EP20205306.2, mailed on Feb. 19, 2021".

"Extended Search Report received for European Patent Application No. 22166210.9, mailed on Oct. 31, 2022".

"First Office Action and Search Report dated Mar. 4, 2020 for Chinese Application No. 201680077608.1 filed Oct. 26, 2016".

"International Preliminary Report on Patentability for Application No. PCT/EP2016/075735, mailed on Jan. 2, 2018".

"International Preliminary Report on Patentability for Application No. PCT/EP2016/075736, mailed on May 11, 2018".

"International Preliminary Report on Patentability for Application No. PCT/EP2016/075737, mailed on May 11, 2018".

"International Preliminary Report on Patentability for Application No. PCT/EP2016/075738, mailed on May 11, 2018".

(56) References Cited

OTHER PUBLICATIONS

"International Preliminary Report on Patentability for Application No. PCT/EP2017/065906, mailed on Jan. 10, 2019".
"International Preliminary Report on Patentability for Application No. PCT/EP2017/065908, mailed on Jan. 10, 2019".
"International Preliminary Report on Patentability for Application No. PCT/EP2017/065909, mailed on Jan. 10, 2019".
"International Preliminary Report on Patentability for Application No. PCT/EP2018/075093, mailed on Mar. 26, 2020".
"International Preliminary Report on Patentability received for PCT Patent Application No. PCT/EP2016/070190, mailed on Mar. 15, 2018".
"International Preliminary Report on Patentability received for PCT Patent Application No. PCT/EP2018/083795, mailed on Jun. 18, 2020".
"International Preliminary Report on Patentability received for PCT Patent Application No. PCT/EP2021/075735, mailed on Apr. 13, 2023".
"International Search Report and Written Opinion for Application No. PCT/EP2017/065906, mailed on Oct. 24, 2017".
"International Search Report and Written Opinion for Application No. PCT/EP2017/065908, mailed on Oct. 17, 2017".
"International Search Report and Written Opinion for Application No. PCT/EP2017/065909, mailed on Oct. 24, 2017".
"International Search Report and Written Opinion for Application No. PCT/EP2018/075093, mailed on Jan. 4, 2019".
"International Search Report and Written Opinion received for PCT Patent Application No. PCT/EP2016/070190, mailed Mar. 13, 2017".
"International Search Report and Written Opinion received for PCT Patent Application No. PCT/EP2016/075736, mailed on Feb. 14, 2017".
"International Search Report and Written Opinion received for PCT Patent Application No. PCT/EP2018/058195, mailed on Nov. 12, 2018".
"International Search Report and Written Opinion received for PCT Patent Application No. PCT/EP2021/075735, mailed on Jan. 5, 2022".
"International Search Report and Written Opinion received for PCT Patent Application No. PCT/EP2016/075737, mailed on Jun. 16, 2017".
"International Search Report and Written Opinion, Application No. PCT/EP2016/075735, mailed Feb. 2, 2017".
"International Search Report and Written Opinion, Application No. PCT/EP2016/075738, mailed Mar. 2, 2017".
"International Search Report for Application No. PCT/EP2018/083795, mailed Mar. 15, 2019".
"Japanese Office Action for JP Application No. 2018-507621, dated Feb. 4, 2020".
"Japanese Office Action, Application No. 2018-507621, dated May 7, 2019".
"Japanese Office Action, Application No. 2018-519932, dated Jun. 25, 2019".
"Japanese Office Action, Application No. 2018-521546, dated Jun. 25, 2019".
"Japanese Office Action, Application No. 2018-521928, mailed Jul. 23, 2019".
"Japanese Office Action, Application No. 2018-522061, dated Jul. 23, 2019".
"Korean Office Action, Application No. 10-2018-7006076, dated Feb. 7, 2019".
"Korean Office Action, Application No. 10-2018-7012353, dated Sep. 26, 2019".
"Korean Office Action, Application No. 10-2018-7012366, dated Mar. 29, 2019".
"Korean Office Action, Application No. 10-2018-7012422, dated Mar. 22, 2019".
"Korean Office Action, Application No. 10-2018-7012428, dated Mar. 22, 2019".
"Notice of Opposition mailed Jun. 3, 2020 for European Application No. 16766494.5".
"Notice of Reason for Refusal received for Japanese Patent Application No. 2022-160803, mailed on Nov. 14, 2023".
"Notice of Reasons for Refusal Office Action mailed Sep. 8, 2020 for Japanese Application No. 2018-567856".
"Notice of Reasons for Refusal received for Japanese Patent Application No. 2022-011143, mailed on Mar. 28, 2023".
"Notice of Reasons for Refusal received for Japanese Patent Application No. 2022-048457, mailed on Jan. 31, 2023".
"Notice of Reasons for Rejection for Japanese Application No. 2022-139703, mailed on Jul. 25, 2023".
"Notice of Reasons for Rejection Office Action mailed Mar. 17, 2020 for Japanese Application No. 2018-522061".
"Notice of Reasons for Rejection received for Japanese Patent Application No. 2020-528003, mailed on Jul. 20, 2021".
"Notice of Reasons of Refusal received for Japanese Patent Application No. 2020-191838, mailed on Jul. 5, 2022".
"Notification of Reason for Refusal mailed Jan. 3, 2022 for Korean Application No. 10-2020-7018918".
"Office Action and Search Report for Chinese Application No. 201880059756, mailed Jan. 14, 2022".
"Office Action and Search Report for Russian Application No. 2020134245, mailed on Jan. 19, 2022".
"Office Action and Search Report mailed Apr. 14, 2020 for Chinese Application No. 201680063711.0".
"Office Action and Search Report mailed Jan. 18, 2022 for Russian Application No. 2020134241".
"Office Action dated Jun. 1, 2021, for Russian Application No. 2020135859".
"Office Action dated Jun. 17, 2021 for Ukraine Application No. a201804590".
"Office Action for Brazilian Application No. 112018077348-4, mailed on Sep. 27, 2021".
"Office action for Brazilian Application No. 112020005010-5, mailed on Jul. 21, 2022".
"Office Action for Canadian Application No. 3,003,519, mailed on Jul. 30, 2021".
"Office Action for Canadian Application No. 3,056,677, mailed on Nov. 24, 2020".
"Office Action for Chinese Application No. 201680072882.X, mailed on Jan. 14, 2021".
"Office Action for Chinese Application No. 201680072882.X, mailed on Sep. 1, 2021".
"Office Action for Chinese Application No. 201780039879.2 mailed on Sep. 18, 2020".
"Office Action for Chinese Application No. 201780040300.4, mailed on Apr. 26, 2022".
"Office Action for Chinese Application No. 201780040300.4, mailed on Nov. 15, 2021".
"Office Action for Chinese Application No. 201880059756.X, mailed Sep. 23, 2022".
"Office Action for Japanese Application No. 2020-093539, mailed on Apr. 6, 2021".
"Office Action for Japanese Application No. 2020-175420, mailed on Oct. 12, 2021".
"Office Action for Japanese Application No. 2020-182740, mailed on Oct. 12, 2021".
"Office Action for Japanese Application No. 2020-182750, mailed on Oct. 12, 2021".
"Office Action for Japanese Application No. 2020-183062, mailed on Nov. 30, 2021".
"Office Action for Japanese Application No. 2020-191836, mailed on Oct. 26, 2021".
"Office Action for Japanese Application No. 2020-191838, mailed on Oct. 26, 2021".
"Office Action for Japanese Application No. 2022-010005, mailed on Mar. 15, 2022".
"Office Action for Korean Application No. 10-2018-7037677, dated May 12, 2021".
"Office Action for Korean Application No. 10-2018-7037677, mailed on Mar. 29, 2021".
"Office action for Korean Application No. 10-2020-7007392, mailed Sep. 26, 2022".

(56) References Cited

OTHER PUBLICATIONS

"Office Action for Korean Application No. 10-2020-7011369, mailed May 10, 2022".
"Office action for Korean Application No. 10-2020-7018918, mailed on Jul. 27, 2022".
"Office Action for Korean Application No. 10-2021-7018056, mailed on Oct. 27, 2021".
"Office Action for Korean Application No. 10-2021-7023346, mailed on Dec. 14, 2021".
"Office Action for Malaysian Application No. PI2018002742, dated Apr. 21, 2021".
"Office Action for Russian Application No. 2020135808, mailed on Apr. 23, 2021".
"Office Action for Russian Application No. 2020135851, mailed on May 24, 2021".
"Office Action for Ukrainian Application No. a201813017, mailed May 6, 2022".
"Office Action mailed Sep. 9, 2020 for Chinese Application No. 201780040874.1".
"Office Action mailed May 12, 2021 for Chinese Application No. 201780040874.1".
"Office Action mailed May 12, 2021 for Korean Application No. 10-2018-7037693".
"Office Action mailed Sep. 15, 2020 for Japanese Application No. 2018-567854".
"Office Action mailed Feb. 16, 2021 for Japanese Application No. 2018-567856".
"Office Action mailed Aug. 19, 2020 for KR Application No. 10-2018-7037693, filed Jun. 27, 2017".
"Office Action mailed Mar. 2, 2021 for Japanese Application No. 2018-567947".
"Office Action mailed Jun. 22, 2022 for Russian Application No. 2019107295".
"Office Action mailed Feb. 25, 2020 for Japanese Application No. 2018-567854".
"Office Action mailed Feb. 25, 2020 for Japanese Application No. 2018-567947".
"Office Action mailed Feb. 25, 2020 for Japanese Appliication No. 2018-567856".
"Office Action mailed Apr. 29, 2021, for Malaysian Application No. PI2018701525".
"Office Action received for Australian Patent Application No. 2022200981, mailed on Dec. 15, 2022".
"Office Action received for Brazilian Patent Application No. 112018077348-4, mailed on Oct. 25, 2022".
"Office Action received for Brazilian Patent Application No. 112018077348-4, mailed on Sep. 2, 2022".
"Office Action received for Brazilian Patent Application No. 122022011678-7, mailed on Feb. 27, 2023".
"Office Action received for Canadian Patent Application No. 3,171,963, mailed on Nov. 22, 2023".
"Office Action received for European Patent Application No. 16798649.6, mailed on Jan. 3, 2022".
"Office Action received for European Patent Application No. 16798649.6, mailed on Jul. 5, 2021".
"Office Action received for European Patent Application No. 16798649.6, mailed on May 25, 2022".
"Office Action received for European Patent Application No. 16798650.4, mailed on Mar. 6, 2020".
"Office Action received for European Patent Application No. 20202666.2, mailed on Jul. 6, 2023".
"Office Action received for European Patent Application No. 20205060.5, mailed on Jul. 28, 2023".
"Office Action received for Korean Patent Application No. 10-2020-7018748, mailed on Jun. 28, 2023".
"Office Action received for Korean Patent Application No. 10-2022-7025860, mailed on Feb. 15, 2023".
"Reason for Rejection received for Korean Patent Application No. 10-2022-7025860, mailed on Aug. 11, 2023".
"Reasons for Refusal received for Japanese Patent Application No. 2022-111113, mailed on Aug. 29, 2023".
"Reasons for Rejection received for Korean Patent Application No. 10-2021-7016788, mailed on Dec. 1, 2023".
"Result of Consultation received for European Patent Application No. 16798650.4, mailed on Feb. 8, 2022".
"Russian Office Action, Application No. 2018115542, dated Oct. 29, 2018".
"Temperature-Sensitive Magnetic Alloys" , NeoMax Materials Co. Ltd., Available Online at <http://www.neomax-materials.co.jp/eng/pr0510.htm>, Oct. 30, 2015 , 2 pages.
Aoun, Abi , "Application and File History for U.S. Appl. No. 15/733,194, filed Jun. 8, 2020".
Aoun, Abi , "Application and File History for U.S. Appl. No. 16/311,405, filed Dec. 19, 2018".
Aoun, Abi , "Application and File History for U.S. Appl. No. 16/311,411, filed Dec. 19, 2018".
Aoun, Abi , "Application and File History for U.S. Appl. No. 16/311,418, filed Dec. 19, 2018".
Blandino , et al. , "Application and File History for U.S. Appl. No. 14/927,532, filed Oct. 30, 2015".
Blandino , et al. , "Application and File History for U.S. Appl. No. 14/927,539, filed Oct. 30, 2015".
Blandino , et al. , "Application and File History for U.S. Appl. No. 14/927,551, filed Oct. 30, 2015".
Blandino , et al. , "Application and File History for U.S. Appl. No. 14/927,556, filed Oct. 30, 2015."
Blandino , et al. , "Application and File History for U.S. Appl. No. 16/946,043, filed Jun. 3, 2020".
Blandino, Thomas P., "Application and File History for U.S. Appl. No. 15/772,394, filed Apr. 30, 2018".
Blandino, Thomas P. , "Application and File History for U.S. Appl. No. 15/754,834, filed Feb. 23, 2018".
Blandino, Thomas P. , "Application and File History for U.S. Appl. No. 15/772,396, filed Apr. 30, 2018".
Blandino, Thomas P. , "Application and File History for U.S. Appl. No. 15/772,399, filed Apr. 30, 2018".
Iorga , et al. , "Low Curie Temperature in Fe—Cr—Ni—Mn Alloys", U.P.B. Sci.Bull., Series B, vol. 73, Iss.4 , 2011 , pp. 195-202.
Kaufman , et al. , "Application and File History for U.S. Appl. No. 14/840,897, filed Aug. 31, 2015".
Kaufman , et al. , "Application and File History for U.S. Appl. No. 14/927,529, filed Oct. 30, 2015".
Kaufman , et al. , "Application and File History for U.S. Appl. No. 14/927,537, filed Oct. 30, 2015".
Kaufman , et al. , "Application and File History for U.S. Appl. No. 16/947,215, filed Jul. 23, 2020".
Kaufman, Duane A , "Application and File History for U.S. Appl. No. 15/772,391, filed Apr. 30, 2018".
Thorsen , et al. , "Application and File History for U.S. Appl. No. 16/647,325, filed Mar. 13, 2020".
Todaka , et al. , "Low Curie Temperature Material for Induction Heating Self-Temperature Controlling System", Journal of Magnetism and Magnetic Materials 320 , 2008 , pp. e702-e707.

* cited by examiner

ARTICLE FOR USE WITH APPARATUS FOR HEATING SMOKABLE MATERIAL

PRIORITY CLAIM

The present application is a divisional application of U.S. patent application Ser. No. 15/772,399, filed Apr. 30, 2018, which is a National Phase entry of PCT Application No. PCT/EP2016/075735, filed Oct. 26, 2016, which claims priority from U.S. patent application Ser. No. 14/927,556, filed Oct. 30, 2015, each of which is hereby fully incorporated herein by reference.

TECHNICAL FIELD

The present disclosure relates to apparatus for heating smokable material to volatilize at least one component of the smokable material, to articles for use with such apparatus, to systems comprising such articles and apparatuses, to methods of manufacturing magnetic field generators for use in such apparatuses, and to methods of manufacturing heaters for use in heating smokable material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides a method of manufacturing a heater for use in heating smokable material to volatilize at least one component of the smokable material, the method comprising: providing a substrate; and forming a closed circuit of heating material on the substrate, wherein the heating material is heatable by penetration with a varying magnetic field, and wherein the forming comprises depositing the heating material on the substrate.

In an exemplary embodiment, the forming comprises depositing the closed circuit of heating material on the substrate.

In an exemplary embodiment, the depositing comprises printing.

In an exemplary embodiment, the method comprises depositing a plurality of closed circuits of heating material on the substrate.

In an exemplary embodiment, the method comprises printing the plurality of closed circuits of heating material on the substrate.

In an exemplary embodiment, the depositing comprises depositing the plurality of closed circuits of heating material on the substrate so that the plurality of closed circuits is out of contact with each other.

In an exemplary embodiment, the depositing comprises depositing the plurality of closed circuits of heating material on the substrate so that the plurality of closed circuits is arranged concentrically in relation to each other.

In an exemplary embodiment, the heater is for use in an article according to the third aspect of the disclosure.

A second aspect of the present disclosure provides a method of manufacturing a magnetic field generator for use in apparatus for heating smokable material to volatilize at least one component of the smokable material, the method comprising: providing a support; and forming an electrically conductive coil on the support, wherein the forming comprises depositing electrically conductive material on the support.

In an exemplary embodiment, the forming comprises depositing the electrically conductive coil on the support.

In an exemplary embodiment, the depositing comprises printing.

In an exemplary embodiment, the forming comprises forming the electrically conductive coil on the support so that the electrically conductive material bonds to the support.

In an exemplary embodiment, the method comprises electrically connecting the electrically conductive coil to a device for passing a varying electrical current through the electrically conductive coil.

In an exemplary embodiment, the method comprises: forming a plurality of electrically conductive coils; and connecting each of the plurality of electrically conductive coils to a device for passing a varying electrical current through the electrically conductive coils.

In an exemplary embodiment, the connecting comprises connecting all of the plurality of electrically conductive coils to the same device.

A third aspect of the present disclosure provides, an article for use with apparatus for heating smokable material to volatilize at least one component of the smokable material, the article comprising: smokable material; and a film defining a closed circuit of heating material, wherein the heating material is heatable by penetration with a varying magnetic field to heat the smokable material.

In an exemplary embodiment, the closed circuit of heating material is a printed closed circuit of heating material.

In an exemplary embodiment, the closed circuit of heating material is a closed circuit of ink.

In an exemplary embodiment, the article comprises one or more films defining a plurality of closed circuits of heating material.

In an exemplary embodiment, the plurality of closed circuits of heating material is arranged concentrically in relation to each other.

In an exemplary embodiment, the heating material is in contact with the smokable material.

In an exemplary embodiment, the article comprises a substrate, and the closed circuit of heating material is on the substrate.

In an exemplary embodiment, the substrate comprises the smokable material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

A fourth aspect of the present disclosure provides apparatus for heating smokable material to volatilize at least one component of the smokable material, the apparatus comprising: a magnetic field generator for generating a varying magnetic field for use in heating the smokable material, wherein the magnetic field generator comprises a film defining a coil of electrically conductive material, and a device for passing a varying electrical current through the coil.

In an exemplary embodiment, the coil is a printed coil.

In an exemplary embodiment, the coil is a coil of ink.

In an exemplary embodiment, the magnetic field generator comprises a support, and the coil is bonded to the support.

In an exemplary embodiment, the coil is a two-dimensional spiral.

In an exemplary embodiment, the magnetic field generator comprises one or more films defining a plurality of coils of electrically conducive material.

In an exemplary embodiment, the plurality of coils is adjacent to each other on the support.

In an exemplary embodiment, a first coil of the plurality of coils occupies a first area on a support, and a second coil of the plurality of coils occupies a second area on a support, wherein the second area is smaller than the first area.

In an exemplary embodiment, each of the plurality of coils is connected to a respective device for passing a varying electrical current through the coil connected to that device.

In an exemplary embodiment, the apparatus comprises a controller, wherein each of the respective devices is connected to the controller.

In an exemplary embodiment, the controller is configured to control each of the respective devices independently to cause the generation of a plurality of respective varying magnetic fields.

In an exemplary embodiment, the apparatus comprises an interface for cooperating with an article comprising the smokable material and heating material that is heatable by penetration with a varying magnetic field to heat the smokable material, and the magnetic field generator is configured so that the varying magnetic field penetrates the interface when the article is cooperating with the interface.

In an exemplary embodiment, the apparatus comprises heating material that is heatable by penetration with a varying magnetic field to heat smokable material, wherein the magnetic field generator is configured so that the varying magnetic field penetrates the heating material of the apparatus.

A fifth aspect of the present disclosure provides apparatus for heating smokable material to volatilize at least one component of the smokable material, the apparatus comprising: a magnetic field generator for generating a varying magnetic field for use in heating the smokable material, wherein the magnetic field generator comprises a coil in the form of a two-dimensional spiral of electrically conductive material, and a device for passing a varying electrical current through the coil.

The apparatus of the fifth aspect may have any one or more of the features of the above-described exemplary embodiments of the apparatus of the fourth aspect of the present disclosure.

A sixth aspect of the disclosure provides a system, comprising: apparatus for heating smokable material to volatilize at least one component of the smokable material; and an article for use with the apparatus, wherein the article comprises the smokable material; wherein the apparatus comprises a magnetic field generator for generating a varying magnetic field for use in heating the smokable material, wherein the magnetic field generator comprises a film defining a coil of electrically conductive material, and a device for passing a varying electrical current through the coil.

In an exemplary embodiment, the article comprises heating material that is heatable by penetration with the varying magnetic field to heat the smokable material, the apparatus comprises an interface for cooperating with the article, and the magnetic field generator is configured so that the varying magnetic field penetrates the heating material of the article when the article is cooperating with the interface.

In an exemplary embodiment, the article of the system is the article of the third aspect of the present disclosure. The article of the system may have any one or more of the features of the above-described exemplary embodiments of the article of the third aspect of the present disclosure.

In an exemplary embodiment, the apparatus comprises heating material that is heatable by penetration with the varying magnetic field to heat the smokable material, and the magnetic field generator is configured so that the varying magnetic field penetrates the heating material of the apparatus.

A seventh aspect of the disclosure provides a system, comprising: apparatus for heating smokable material to volatilize at least one component of the smokable material; and an article for use with the apparatus, wherein the article comprises smokable material and a film defining a closed circuit of heating material, wherein the heating material is heatable by penetration with a varying magnetic field to heat the smokable material; wherein the apparatus comprises an interface for cooperating with the article, and a magnetic field generator for generating a varying magnetic field to be used in heating the heating material when the article is cooperating with the interface.

In an exemplary embodiment, the apparatus of the system is the apparatus of the fourth aspect of the present disclosure. The apparatus of the system may have any one or more of the features of the above-described exemplary embodiments of the apparatus of the fourth aspect of the present disclosure.

BRIEF DESCRIPTION OF THE DRAWINGS

Embodiments of the disclosure will now be described, by way of example only, with reference to the accompanying drawings, in which.

DETAILED DESCRIPTION

Figure 1:
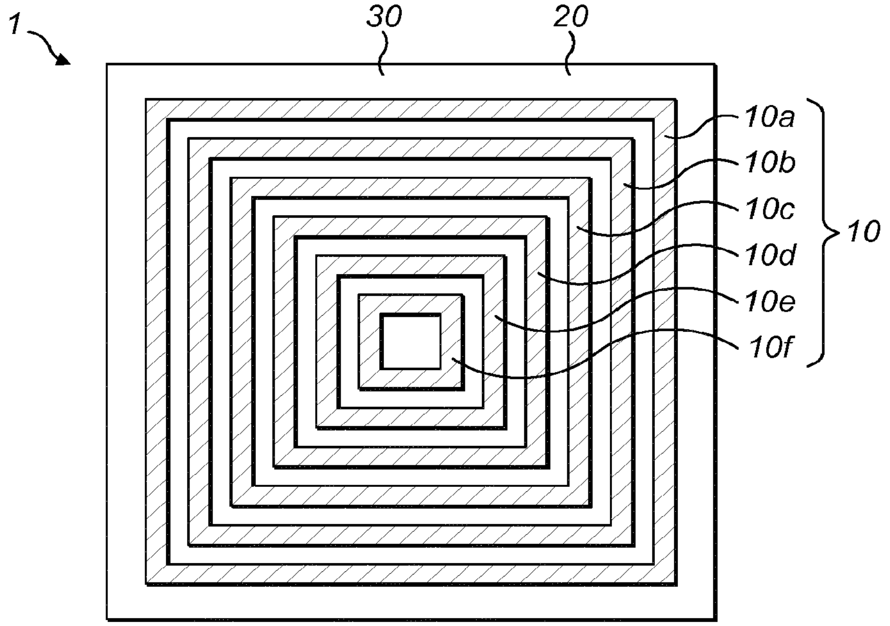
FIG. 1 shows a schematic front view of a portion of an example of an article for use with apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

As used herein, the terms "flavor" and "flavorant" refer to materials which, where local regulations permit, may be used to create a desired taste or aroma in a product for adult consumers. They may include extracts (e.g., licorice, *hydrangea*, Japanese white bark *magnolia* leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, *cassia*, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, gel, powder, or the like.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 2:
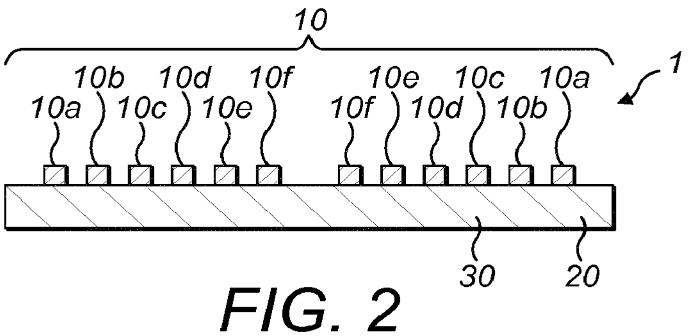
FIG. 2 shows a schematic cross-sectional view of the portion of the article of FIG. 1.

Referring to FIGS. 1 and 2 there are respectively shown a schematic front view and a schematic cross-sectional view of a portion of an article 1 according to an embodiment of the disclosure. The article 1 is for use with apparatus for heating smokable material to volatilize at least one component of the smokable material without burning the smokable material. In this embodiment, the article 1 comprises a substrate 20 and one or more films defining a plurality of closed circuits 10*a-f* of heating material 10. The heating material 10 is heatable by penetration with a varying magnetic field.

A thickness of the, or each, film defining the closed circuits 10*a-f* of heating material 10 may be no more than 1 micron, such as below 1 micron. In other embodiments, the thickness of the film may be more than 1 micron, such as more than 10 microns or more than 100 microns.

In this embodiment, the substrate 20 comprises smokable material 30, such as tobacco. In some embodiments, the substrate 20 may comprise or consist entirely, or substantially entirely, of the smokable material 30, e.g. tobacco, such as reconstituted smokable material, e.g. reconstituted tobacco. The latter is sometimes referred to as "tobacco recon".

In this embodiment, the plurality of closed circuits 10*a-f* of heating material 10 are heatable in use to heat the smokable material 30 to volatilize at least one component of the smokable material 30. Each of the closed circuits 10*a-f* of heating material 10 may be considered a heater for use in heating smokable material.

In some embodiments, the article 1 may comprise only one closed circuit 10*a* of heating material 10. In such embodiments, the closed circuit 10*a* of heating material 10 is heatable in use to heat smokable material 30 to volatilize at least one component of the smokable material 30. In other embodiments, such as that illustrated, the article 1 may comprise more than one closed circuit 10*a*-10*f* of heating material 10.

In this embodiment, each of the plurality of closed circuits 10*a-f* of heating material 10 is square or rectangular. In other embodiments, each of the plurality of closed circuits 10*a-f* may be of any shape that defines a path that starts and ends at the same point so as to create a loop, such as circular or elliptical.

In this embodiment, each of the plurality of closed circuits 10*a-f* of heating material 10 has a uniform width and a uniform thickness. In other embodiments, each of the plurality of closed circuits 10*a-f* of heating material may be different to at least one other of the closed circuits 10*a-f*. For example, the closed circuits 10*a-f* may have different widths of thicknesses. In other embodiments, a single closed circuit 10*a* may have a varying thickness or width along its path. Such variations in the width or thickness of the closed circuits 10*a-f* of heating material 10 can focus the heating of the heating material 10, which can result in a variation in the rate at which the heating material 10 volatilizes the smokable material 30.

In some embodiments, the closed circuits 10*a-f* of heating material 10 can result in magnetic coupling between the closed circuits 10*a-f* of heating material 10 and an electromagnet of the apparatus in use being enhanced, which results in greater or improved Joule heating.

In this embodiment, and indeed in all embodiments discussed herein, the heating material 10 is aluminum. However, in other embodiments, the heating material 10 may comprise one or more materials selected from the group consisting of: an electrically-conductive material, a magnetic material, and a non-magnetic material. In some embodiments, the heating material 10 may comprise a metal or a metal alloy. In some embodiments, the heating material 10 may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. It has also been found that, when magnetic electrically-conductive material is used as the heating material 10, magnetic coupling between the magnetic electrically-conductive material and an electromagnet of the apparatus in use may be enhanced. In addition to potentially enabling magnetic hysteresis heating, this can result in greater or improved Joule heating of the heating material 10, and thus greater or improved heating of the smokable material 30.

In this embodiment, each of the plurality of closed circuits 10*a-f* of heating material 10*a-f* is in contact with the substrate 20. In some embodiments, the heating material 10 may be in the form of an ink. The closed circuits 10*a-f* of heating material 10 may thus be deposited directly on the substrate 20, for example by printing. Printing ink comprising heating material 10 on the substrate 20 may result in close integration of the heating material 10 with the substrate 10, which may result in good thermal transfer between the heating material 10 and the smokable material 30 comprised in the substrate 20.

Ink and films may have a small thickness. Therefore, induced electrical current and/or induced reorientation of magnetic dipoles in the ink or film when subjected to a varying magnetic field may penetrate most or all of the ink or film, rather than be confined to just a "skin" thereof as can be the case when a component comprising heating material has too great a thickness. Thus, a more efficient use of material is achieved and, in turn, costs are reduced.

In some embodiments, the depositing may result in the formation of the closed circuits 10*a-f*. In other embodiments, this may not be the case. For example, a film of heating material 10 may be deposited on the substrate 20, and then the closed circuits 10*a-f* of heating material 10 may be formed from the film, for example by etching the film.

In this embodiment, the plurality of closed circuits 10*a-f* of heating material 10 is out of contact with each other. That is, they do not touch each other. In other embodiments, one or more of the plurality of closed circuits 10*a-f* may be in contact with one or more others of the plurality of closed circuits 10*a-f*.

In this embodiment, the plurality of closed circuits 10*a-f* of heating material 10 is arranged concentrically in relation to each other. In other embodiments, the plurality of closed circuits 10*a-f* of heating material 10 may be arranged so that each of the closed circuits 10*a-f* is outside of each other of the closed circuits 10*a-f*, or in any other arrangement.

In this embodiment, heating material 10 is deposited on an initially flat substrate 20. In this embodiment, the substrate 20 and the plurality of closed circuits 10*a-f* of heating material 10 are together flexible or malleable. By "malleable" it is meant that article 1 is able to be pressed, bent, rolled, folded or flexed so as to take on different overall shapes without breaking for cracking, for example a cylindrical shape. The degree of flexibility depends on the material and thickness of the substrate 20, and the composition of the closed circuits 10*a-f* of heating material 10. Such flexibility may increase the versatility of the article 1, for example by increasing the number of plausible configurations for the article 1. Such constructions may be suitable for use in articles of a variety of different shapes. For example, the substrate 20 may be a layer on a surface of an article, may define a recess in an article, or may be flexed to fit into a recess in an article. In other embodiments, the substrate 20 and the plurality of closed circuits 10*a-f* of heating material 10 together may be substantially rigid.

In this embodiment, the substrate 20 is substantially planar. In some embodiments, the substrate 20 may instead be non-planar, such as tubular. The closed circuits 10*a-f* of heating material 10 would then be on a surface of the tubular substrate 20. In other embodiments, the substrate 20 may be any other shape, for example conical.

In this embodiment, the plurality of closed circuits 10*a-f* of heating material 10 is bonded to the substrate 20. The bonding may be achieved, for example, by a process of printing the heating material 10, or by adhering the heating material 10 to the substrate 20 using an adhesive. In other embodiments, the bonding may be achieved by a deposition process involving physical locking or intermingling of the heating material 10 and the substrate 20, or the heating material 10 and the smokable material 30. In some embodiments, when the deposition process comprises printing, a bond may be achieved by partial absorption of ink by the substrate 20. In embodiments in which the substrate 20 comprises the smokable material 30, such bonding of the heating material 10 to the substrate 20 may result in better thermal conduction from the heating material 10 to the substrate 20, and thus a higher proportion of the smokable material 30 being volatilized in use.

Figure 3:
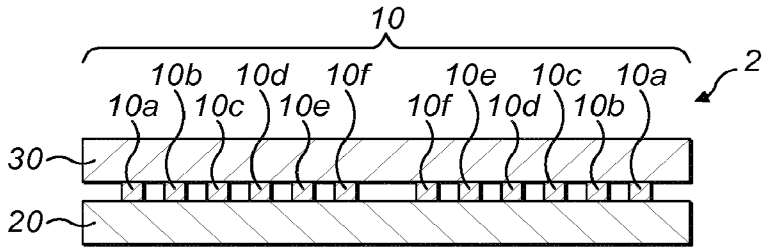
FIG. 3 shows a schematic cross-sectional view of a portion of an example of another article for use with apparatus for heating smokable material to volatilize at least one component of the smokable material.

Referring to FIG. 3 there is shown a schematic cross-sectional view of an example of another article according to an embodiment of the disclosure. The article 2 is identical to the article 1 of FIGS. 1 and 2, except that the substrate 20 of the article 2 of FIG. 3 does not comprise smokable material 30. Instead, the smokable material 30 is separate to substrate 20.

In this embodiment, the substrate comprises paper or card. However, in some embodiments, the substrate 20 may additionally or alternatively comprise thermal insulation. Such thermal insulation can help to increase the proportion of heat which heats the smokable material 30 when the heating material 10 is heated by penetration with a varying magnetic field.

In this embodiment, the smokable material 30 is comprised in a layer on the plurality of closed circuits 10*a-f* of heating material 10 and may, for example, be a layer of tobacco recon. That is, the closed circuits 10*a-f* of heating material 10 are arranged between the substrate 20 and the smokable material 30. In other embodiments, the smokable material 30 may be positioned on the substrate 20, and surrounding, at least in part, each of the plurality of closed circuits 10*a-f* of heating material 10. Each of the closed circuits 10*a-f* of heating material 10, and indeed the combination of the substrate 20 and the plurality of closed circuits 10*a-f* of heating material 10, may be considered a heater for use in heating smokable material.

In some embodiments, which may be respective variations to the embodiments discussed above, the article 1, 2 may comprise a mouthpiece defining a passageway that is in fluid communication with the smokable material 30. The mouthpiece may be made of any suitable material, such as a plastics material, cardboard, cellulose acetate, paper, metal, glass, ceramic, or rubber. In use, when the smokable material 30 is heated, volatilized components of the smokable material 30 can be readily inhaled by a user. In embodiments in which the article is a consumable article, once all or substantially all of the volatilizable component(s) of the smokable material 30 in the article has/have been spent, the user may dispose of the mouthpiece together with the rest of the article. This can be more hygienic than using the same mouthpiece with multiple articles, can help ensure that the mouthpiece is correctly aligned with the smokable material, and presents a user with a clean, fresh mouthpiece each time they wish to use another article. The mouthpiece, when provided, may comprise or be impregnated with a flavorant. The flavorant may be arranged so as to be picked up by heated vapor as the vapor passes through the passageway of the mouthpiece in use.

Each of the above-described articles 1, 2 and described variants thereof is usable with apparatus for heating the smokable material 30 to volatilize at least one component of the smokable material 30. When preparing the article 1, 2 for use with the apparatus, the article 1, 2 may first be rolled by a user so as to take on a substantially cylindrical shape. In some embodiments, the article 1, 2 may be provided to a user in a pre-rolled state. The apparatus may be to heat the smokable material 30 to volatilize the at least one component of the smokable material 30 without burning the smokable material 30. Example such apparatuses are described below.

Figure 4:
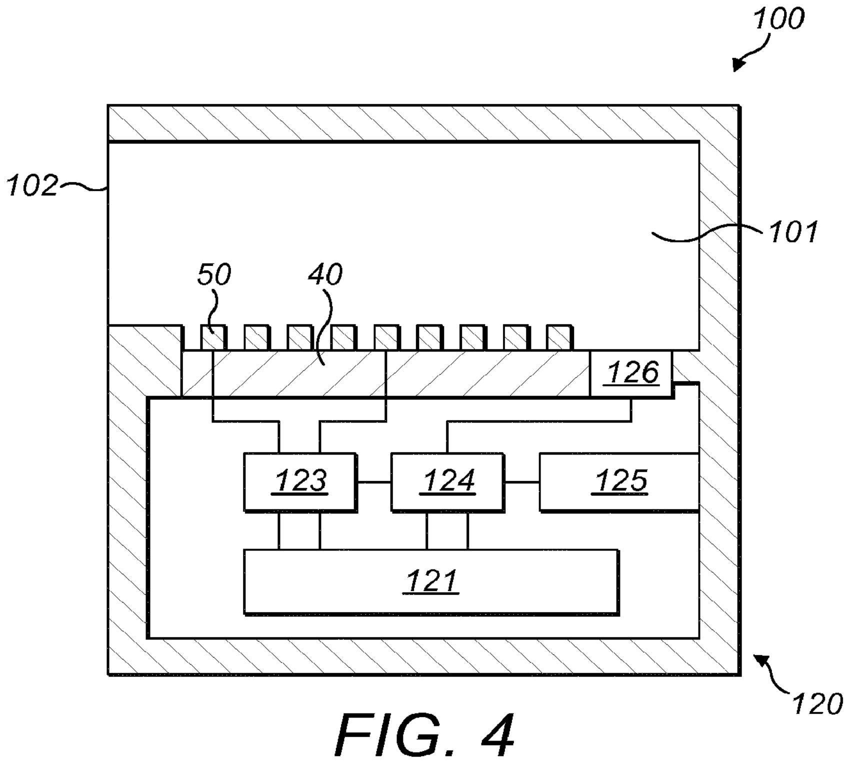
FIG. 4 shows a schematic cross-sectional view of an example of apparatus for heating smokable material to volatilize at least one component of the smokable material.

Referring to FIG. 4 there is shown an example of apparatus for heating smokable material to volatilize at least one component of the smokable material. The apparatus 100 is for use with an article comprising smokable material 30 and heating material 10, such as one of the articles 1, 2 discussed above.

The apparatus 100 of this embodiment comprises a magnetic field generator 120. The magnetic field generator 120 comprises an electrical power source 121, a film defining a coil 50 on a support 40, a device 123 for passing a varying electrical current, such as an alternating current, through the coil 50, a controller 124, a user interface 125 for user-operation of the controller 124, a temperature sensor 126, and an interface 101 for cooperating with the article.

A thickness of the film defining the coil 50 of electrically conductive material may be no more than 1 micron, such as below 1 micron. In other embodiments, the thickness of the film may be more than 1 micron, such as more than 10 microns or more than 100 microns.

In this embodiment, the interface 101 comprises a recess 101 that is configured to receive the article via the opening 102. The recess 101 is configured to release the article via an opening 102 of the apparatus 100 after use of apparatus 100. The article may be released from the recess 101 by a user and replaced by another article for repeated use of the apparatus 100.

In this embodiment, the electrical power source 121 is a rechargeable battery. In other embodiments, the electrical power source 121 may be other than a rechargeable battery, such as a non-rechargeable battery, a capacitor, a battery-capacitor hybrid, or a connection to a mains electricity supply.

Figure 6:
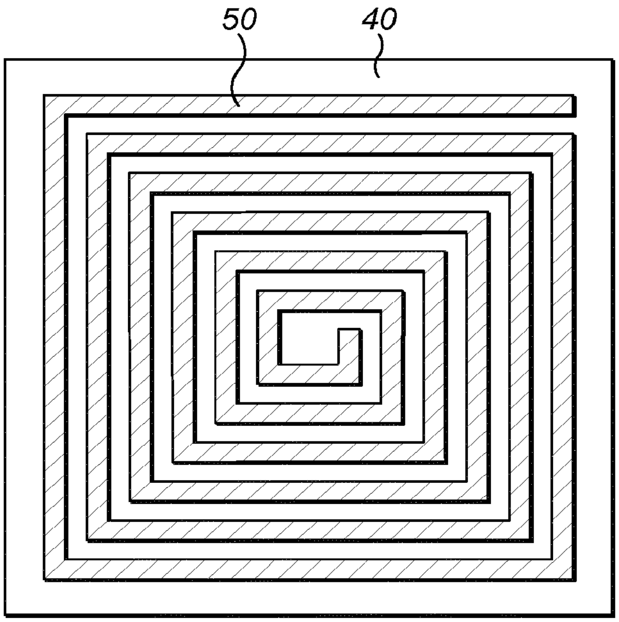
FIG. 6 shows a schematic front view of a portion of a magnetic field generator of the apparatus of FIG. 4.
Figure 7:
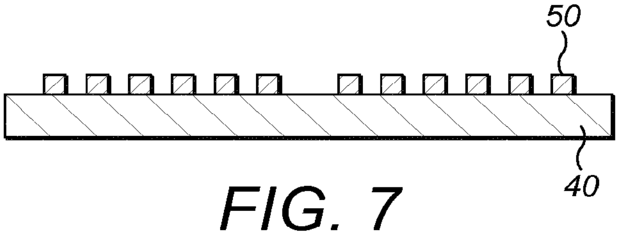
FIG. 7 shows a schematic cross-sectional view of the portion of the magnetic field generator of FIG. 6.

Referring to FIGS. 6 and 7, there are respectively shown a schematic front view and a schematic cross-sectional view of the coil 50 and support 40 of the apparatus 100 of FIG. 4.

In this embodiment, the coil 50 is a two-dimensional spiral on a surface of the support 40. The coil 50 is defined by a film. In this embodiment, the support 40 is a non-electrically conductive support 40. That is, the support 40 is an electrical insulator. In other embodiments, the support 40 may be omitted.

In some embodiments, the coil 50 is deposited on a flat support 40. In this embodiment, the support 40 and the film defining coil 50 are together flexible or malleable. By "malleable" it is meant that an assembly of the support 40 and the film defining coil 50 is able to be pressed, bent, rolled, folded or flexed so as to take on different overall shapes without breaking for cracking, for example a cylindrical shape. The degree of flexibility depends on the material and thickness of the support 40, and the composition of the electrically conductive material of the coil 50. By altering the shape of an assembly of the support 40 and the film defining the coil 50 so that it has a three-dimensional shape, a three-dimensional transverse flux design may occur, when a varying electrical current is passed through the coil 50. Such a three-dimensional transverse flux design increases the number of plausible configurations for apparatus 100. For example, the support 40 may be a layer on a surface of the apparatus 100, may define a recess in the apparatus 100, or may be flexed to fit into a recess in the apparatus 100. In other embodiments, the support 40 and the film defining the coil 50 together may be substantially rigid.

In this embodiment, the coil 50 is an electrically conductive coil configured to conduct a varying electrical current. In this embodiment, the electrically conductive material of the coil 50 is an electrically conductive film in the form of ink. The coil 50 of this embodiment thus comprises electrically conductive material.

In this embodiment, the coil 50 is in contact with the support 40. The coil 50 may be deposited directly on support 40. Depositing directly on the support 40 may result in a close integration of the electrically conductive ink with the support 40, which may better bind the coil 50 to the substrate 40 and help to avoid delamination. The depositing may, for example, comprise printing.

In some embodiments, the depositing may result in the formation of the coil 50. In other embodiments, this may not be the case. For example, a film of electrically conductive material may be deposited on the support 40, and the coil 50 may be formed from the film, for example by etching the film.

In this embodiment, the coil 50 is bonded to the support 40. The bonding may be achieved by, for example, printing or chemically or mechanically adhering the coil 50 to the support 40. In other embodiments, the bonding may be achieved by a deposition process involving physical locking or intermingling of the coil 50 and the support 40. In some embodiments, when the deposition process comprises printing, a bond may be achieved by partial absorption of ink by the support 40.

In this embodiment, the coil 50 is a two-dimensional spiral. In this embodiment, coil 50 is a generally square or rectangular coil. In other embodiments, the coil 50 may have a different shape, such as generally circular or elliptical. In some embodiments, the coil 50 may be a three-dimensional spiral. In some such embodiments, the coil 50 may be manufactured using an additive manufacturing technique, such as 3D printing.

In this embodiment, adjacent spaced portions of the coil 50 are regularly spaced. In other embodiments, such portions of the coil 50 may not be regularly spaced. Relatively-closely spaced portions of the coil 50 may create a denser magnetic flux in use than less-closely-spaced portions of the coil 50. Such a structure may enable progressive heating of smokable material, and thereby progressive generation of vapor, to be achieved.

In this embodiment, the combination of the support 40 and the coil 50 is flexible. The degree of flexibility depends on the material and thickness of each of the support 40 and the coil 50. In other embodiments, the combination of the support 40 and the coil 50 may be relatively rigid. By providing that the combination of the support 40 and the coil 50 is flexible, the combination of the support 40 and the coil 50 may be fitted into an irregularly-shaped space in the apparatus 100. Further, by providing that the combination of the support 40 and the coil 50 is flexible, the combination of the support 40 and the coil 50 may be more resistant to damage.

With reference once again to FIG. 4, it will be seen that in this embodiment the combination of the support 40 and the coil 50 define part of the recess 101. In other embodiments, a protective structure may be provided between the combination of the support 40 and the coil 50 and the recess 101, to help protect the support 40 and the coil 50 from damage during use of the apparatus 100.

In this embodiment, the device 123 for passing a varying electrical current through the coil 50 is electrically connected between the electrical power source 121 and the coil 50. In this embodiment, the controller 124 also is electrically connected to the electrical power source 121, and is communicatively connected to the device 123. More specifically, in this embodiment, the controller 124 is for controlling the device 123, so as to control the supply of electrical power from the electrical power source 121 to the coil 50. In this embodiment, the controller 124 comprises an integrated circuit (IC), such as an IC on a printed circuit board (PCB). In other embodiments, the controller 124 may take a different form. In some embodiments, the apparatus may have a single electrical or electronic component comprising the device 123 and the controller 124. The controller 124 is operated in this embodiment by user-operation of the user interface 125. In this embodiment, the user interface 125 is located at the exterior of the apparatus 100. The user interface 125 may comprise a push-button, a toggle switch, a dial, a touchscreen, or the like. In other embodiments, the user interface 125 may be remote and connected to the rest of the apparatus wirelessly, such as via Bluetooth.

In this embodiment, operation of user interface 125 by a user causes the controller 124 to cause the device 123 to cause a varying electrical current to pass through the coil 50, so as to cause the coil 50 to generate a varying magnetic field. When the article 1, 2 is located in the recess 101, the coil 50 of the apparatus 100 and the heating material 10 of the article 1, 2 are suitably relatively positioned so that the alternating magnetic field produced by the coil 50 penetrates the heating material 10 of the article 1, 2. When the heating material 10 of the article 1, 2 is an electrically-conductive material, this may cause the generation of one or more eddy currents in the heating material 10. The flow of eddy currents in the heating material 10 against the electrical resistance of the heating material 10 causes the heating material 10 to be heated by Joule heating. As mentioned above, when the heating material 10 is made of a magnetic material, the orientation of magnetic dipoles in the heating material 10 changes with the changing applied magnetic field, which causes heat to be generated in the heating material 10.

The apparatus 100 of this embodiment comprises a temperature sensor 126 for sensing a temperature of the recess 101. The temperature sensor 126 is communicatively connected to controller 124, so that controller 124 is able to monitor the temperature of the recess 101. In some embodiments, the temperature sensor 126 may be arranged to take an optical temperature measurement of the recess 101 or article 1, 2. In some embodiments, the article to be located in the recess 101 may comprise a temperature detector, such as a resistance temperature detector (RTD), for detecting a temperature of the article. The article may further comprise one or more terminals connected, such as electrically-connected, to the temperature detector. The terminal(s) may be for making connection, such as electrical connection, with a temperature monitor (not shown) of the apparatus 100 when the article is in recess 101. The controller 124 may comprise the temperature monitor. The temperature monitor of apparatus 100 may thus be able to determine a temperature of the article during use of the article with the apparatus 100.

In some embodiments, by providing that a component of the article 1, 2 comprising the heating material 10 has a suitable resistance, the response of the heating material 10 to a change in temperature could be sufficient to give information regarding temperature inside the article 1, 2. The temperature sensor 126 of the apparatus 100 may then comprise a probe for analyzing the heating material.

On the basis of one or more signals received from temperature sensor 126 or temperature detector, the controller 124 may cause the device 123 to adjust a characteristic of the varying electrical current passed through the coil 50 as necessary, in order to ensure that the temperature of the recess 101, article 1,2 or heating material 10 remains within a predetermined temperature range. The characteristic may be, for example, amplitude or frequency. Within the predetermined temperature range, in use the smokable material 30 within an article 1, 2 located in the recess 101 is heated sufficiently to volatilize at least one component of the smokable material 30 without combusting the smokable material 30. Accordingly, the controller 124, and the apparatus 100 as a whole, is arranged to heat the smokable material 30 to volatilize the at least one component of the smokable material 30 without combusting the smokable material 30. In some embodiments, the temperature range is about 50° C. to about 250° C., such as between about 50° C. and about 150° C., between about 50° C. and about 120° C., between 25 about 50° C. and about 100° C., between about 50° C. and about 80° C., or between about 60° C. and about 70° C. In some embodiments, the temperature range is between about 170° C. and about 220° C. In other embodiments, the temperature range may be other than these ranges. In some embodiments, the temperature sensor 126 may be omitted.

In some embodiments, the apparatus 100 may comprises a mouthpiece (not shown). The mouthpiece may be releasably engageable with the rest of apparatus 100 so as to connect the mouthpiece to the rest of apparatus 100. In other embodiments, the mouthpiece and the rest of apparatus 100 may be permanently connected, such as through a hinge or flexible member. The mouthpiece may be locatable so as to cover the opening 102 into the recess 101. When the mouthpiece is so located, a channel through the mouthpiece may be in fluid communication with the smokable material 30. In use, the channel acts as a passageway for permitting volatilized material to pass from the smokable material 30 to an exterior of apparatus 100. The mouthpiece, when provided, may comprise or be impregnated with a flavorant. The flavorant may be arranged so as to be picked up by heated vapor as the vapor passes through the passageway of the mouthpiece in use.

As the smokable material 30 in the article 1, 2 is being heated, a user may be able to inhale the volatilized component(s) of the smokable material 30 by drawing the volatilized component(s) through a mouthpiece of the article (when provided) or through a mouthpiece of the apparatus 100 (when provided). Air may enter the article via a gap between the article and apparatus 100, or in some embodiments apparatus 100 may define an air inlet that fluidly connects the smokable material 30 with the exterior of apparatus 100. As the volatilized component(s) are removed from the article, air may be drawn into smokable material 30 via the air inlet of apparatus 100.

Some embodiments of the apparatus 100 may be arranged to provide haptic feedback to a user. The feedback could indicate that heating is taking place, or be triggered by a timer to indicate that greater than a predetermined proportion of the original quantity of volatilizable component(s) of the smokable material 30 in an article in has/have been spent, or the like. The haptic feedback could be created by interaction of the coil 50 and the heating material 10, by interaction of an electrically-conductive element with the coil 50, by rotating an unbalanced motor, by repeatedly applying and removing a current across a piezoelectric element, or the like.

In some embodiments, the apparatus may comprise more than one coil. The plurality of coils of the apparatus could be operable to provide progressive heating of the smokable material in an article 1, 2, and thereby progressive generation of vapor. For example, one coil may be able to heat a first region of the heating material 10 relatively quickly to initialize volatilization of at least one component of the smokable material and formation of a vapor in a first region of the smokable material. Another coil may be able to heat a second region of the heating material 10 relatively slowly to initialize volatilization of at least one component of the smokable material and formation of a vapor in a second region of the smokable material. Accordingly, a vapor is able to be formed relatively rapidly for inhalation by a user, and vapor can continue to be formed thereafter for subsequent inhalation by the user even after the first region of the smokable material may have ceased generating vapor. The initially-unheated second region of smokable material could act as a heat sink, to reduce the temperature of created vapor or make the created vapor mild, during heating of the first region of smokable material.

Figure 8:
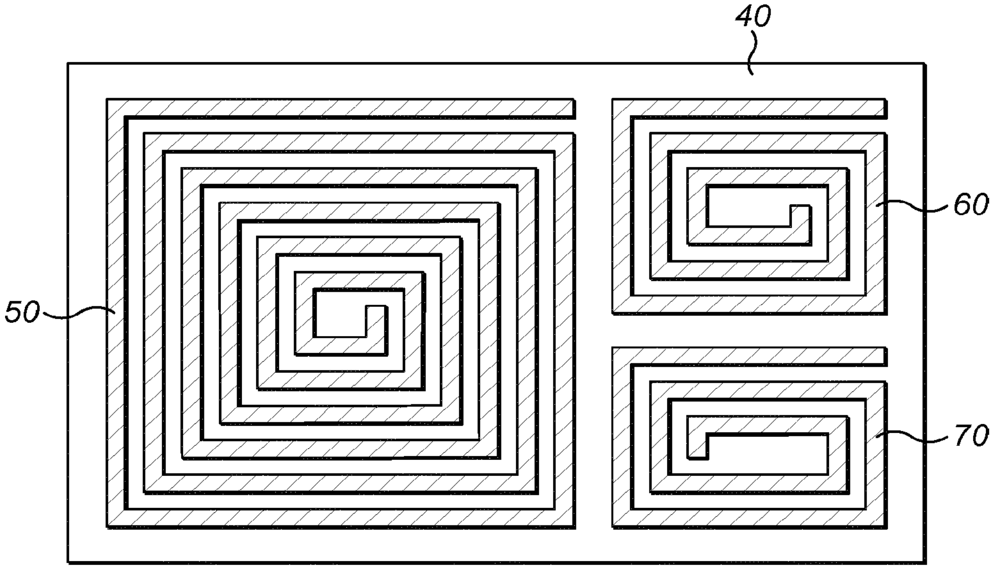
FIG. 8 shows a schematic front view of a portion of an example of another magnetic field generator of apparatus for heating smokable material to volatilize at least one component of the smokable material.

Referring to FIG. 8 there is shown a schematic front view of a structure comprising a support 40 and one or more films defining a plurality of coils 50, 60, 70 adjacent to each other on the support 40. The structure of FIG. 8 may be usable in the apparatus 100 of FIG. 4 in place of the structure of FIGS. 6 and 7.

In this embodiment, each of the plurality of coils 50, 60, 70 comprises electrically conductive material. Each of the plurality of coils 50, 60, 70 may be provided on the support 40 using any of the processes described herein for the provision of the coil 50 on the support 40 of FIG. 6.

While in this embodiment the structure comprises first to third coils 50, 60, 70, in other embodiments the structure may comprise two coils or more than three coils of electrically conductive material.

In this embodiment, each of the coils 50, 60, 70 occupies a respective area on the support 40. In this embodiment, the first coil 50 occupies a first area, the second coil 60 occupies a second area which is smaller than the first area, and the third coil 70 occupies a third area. In this embodiment, the second and third areas are substantially equal. In other embodiments, the second and third areas may be of respective different sizes. In some embodiments, the coils 50, 60, 70 may occupy respective same-sized areas.

In use, each of the coils 50, 60, 70 may be used in heating respective different regions of heating material 10 of an article located in the recess 101. That is, the respective varying magnetic fields created by the coils 50, 60, 70 may penetrate different respective regions of the heating material 10. The different regions of the heating material 10 may be configured to heat respective different areas of smokable material 30 in the article that may, for example, comprise different flavorants and thereby release vapor of different respective flavors.

In some embodiments, each of the coils 50, 60, 70 may be connected to the same, common device 123 for passing respective varying electrical current through the coils 50, 60, 70. In other embodiments, the coils 50, 60, 70 may be connected to respective separate devices 123 for passing a varying electrical current through the coil 50, 60, 70 connected to the device 123.

In various embodiments, the device 123, or each of the devices 123, is connected to the controller 124. The controller 124 is configured to control the one, or each, device 123 to cause the generation of a plurality of respective varying magnetic fields. The controller 124 may be configured to control the device(s) 123 so as to control independently the varying magnetic fields output from the coils 50, 60, 70.

In some embodiments, the varying electrical current may be passed through the coils 50, 60, 70 simultaneously. This may allow a greater area of heating material 10 to be heated sufficiently at any one time, or may allow a smaller area of heating material 10 to be heated in a shortened period of time. In other embodiments, the varying electrical current may be passed through the coils 50, 60, 70 in a predetermined sequence. The coils 50, 60, 70 may be operable to provide progressive heating of the heating material 10, and thus progressive heating of the smokable material 30 in the article located in recess 101, so as to provide progressive generation of vapor, as described above.

In some embodiments, the controller 124 may be configured to control the device(s) 123 in such a way that the coils 50, 60, 70 are caused to output respective varying magnetic fields in a cyclical or peristaltic manner. In some embodiments, the cyclically or peristaltically output varying magnetic fields may heat respective portions of heating material 10 cyclically or peristaltically, so as to heat the vapor output from the smokable material 30 in a cyclical or peristaltic manner. This may cause movement of the vapor in a predetermined direction, such as towards an outlet of the apparatus 100 and thus towards a user at the outlet.

In the embodiment of FIG. 4, the apparatus 100 is for use with an article 1, 2 that itself comprises heating material 10 that is heatable by penetration with a varying magnetic field. However, in some embodiments, the apparatus may additionally or alternatively comprise such heating material.

Figure 5:
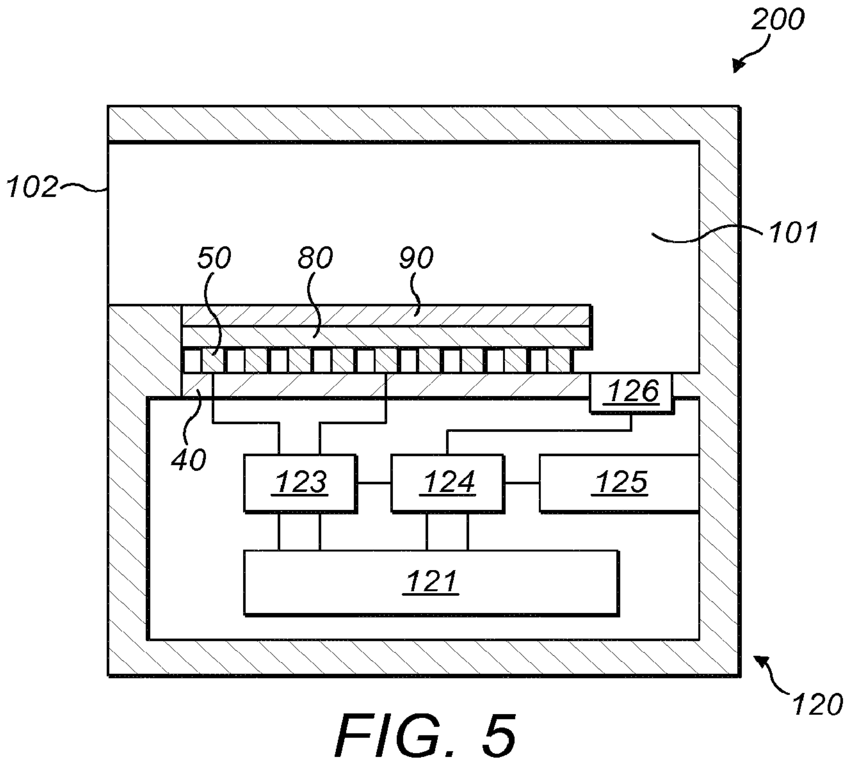
FIG. 5 shows a schematic cross-sectional view of an example of another apparatus for heating smokable material to volatilize at least one component of the smokable material.

Referring to FIG. 5, there is shown a schematic cross-sectional view of an example of apparatus for heating smokable material to volatilize at least one component of the smokable material according to another embodiment of the present disclosure. The apparatus 200 of this embodiment is for use with an article comprising smokable material 30. The apparatus 200 is substantially similar to apparatus 100, except that it further comprises thermal insulation 80 and heating material 90.

In this embodiment, the thermal insulation 80 is located between the coil 50 and the heating material 90. The thermal insulation 80 may comprise, for example, one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card. The thermal insulation 80 may additionally or alternatively comprise an air gap. Such thermal insulation 80 may help to prevent heat loss from the heating material 90 to components of the apparatus 200, may help to increase heating efficiency of the smokable material 30 of the article 1, 2 in the recess 101, and/or may help to reduce the transfer of heating energy from the heating material 90 to an outer surface of apparatus 200. This may improve the comfortableness with which a user is able to hold apparatus 200.

In some embodiments, the coil 50 may be embedded in the thermal insulation 80. The thermal insulation 80 may abut or envelop the coil 50. In addition to the thermal benefits discussed above, such a configuration may help to increase the robustness of the apparatus 200, such as by helping to maintain the relative positioning of the coil 50 and the recess 101.

In some embodiments, the thermal insulation 80 may be omitted.

In this embodiment, the recess 101 is partially defined by the heating material 90.

In some embodiments, the heating material 90 may comprise deposited heating material 10 or ink. The heating material 90 may be deposited on the thermal insulation 80, for example, by printing. The heating material 90 may comprise at least one closed circuit of heating material, which may provide the benefits described elsewhere herein.

The inclusion of the heating material 90 in the apparatus 200 reduces the required complexity of an article for use with the apparatus 200. Heating material may be used repeatedly for heating smokable material 30, and thus it may be an efficient use of heating material to include the heating material 90 in the apparatus 200 rather than in a consumable article for use with the apparatus 200.

An impedance of the coil 50 of this embodiment is equal, or substantially equal, to an impedance of the heating material 90. If the impedance of the heating material 90 were instead lower than the impedance of the coil 50, then the voltage generated across the heating material 90 in use may be lower than the voltage that may be generated across the heating material 90 when the impedances are matched. Alternatively, if the impedance of the heating material 90 were instead higher than the impedance of the coil 50, then the electrical current generated in the heating material 90 in use may be lower than the current that may be generated in heating material 90 when the impedances are matched. Matching the impedances may help to balance the voltage and current to maximize the heating power generated at the heating material 90 when heated in use. However, in some other embodiments, the impedances may not be matched.

Figure 9:
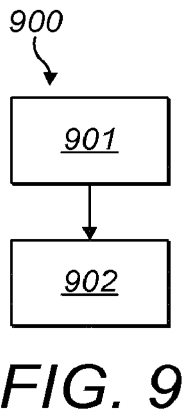
FIG. 9 is a flow diagram showing an example of a method of manufacturing a heater for use in heating smokable material to volatilize at least one component of the smokable material.

Referring to FIG. 9 there is shown a flow diagram of an example method of manufacturing a heater for use in heating smokable material to volatilize at least one component of the smokable material, in accordance with an embodiment of the disclosure.

Broadly speaking, the method 900 of this embodiment comprises providing 901 a substrate, and forming 902 a closed circuit of heating material on the substrate. The forming comprises depositing the heating material. The heating material 10 is heatable by penetration with a varying magnetic field.

A closed circuit of heating material may be of any shape that defines a path that starts and ends at the same point so as to create a loop.

In this embodiment, the substrate comprises smokable material. In other embodiments, the substrate may be free of smokable material. In some embodiments, the method 900 may comprise a step of providing smokable material, such as on the substrate or on the heating material.

In this embodiment, the forming 902 comprises depositing the closed circuit of heating material on the substrate. However, in other embodiments, the forming 902 may comprise depositing a film of heating material, and then forming the closed circuit 10*a* of heating material from the film, for example by etching the film.

The heating material may be in the form of an ink. The heating material may be suitable for use in an additive manufacturing technique, such as 3D printing. The use of an ink may help to ensure that the closed circuit is of a pre-determined structure and of an even thickness on the substrate. The use of an ink also can result in an efficient use of heating material. Other benefits of using ink are discussed elsewhere herein.

In some embodiments, the forming 902 comprises forming a plurality of closed circuits of heating material. In such embodiments, each of the plurality of closed circuits of heating material may be of any shape that defines a path that starts and ends at the same point so as to create a loop.

The plurality of closed circuits of heating material may be arranged so that they are out of contact with each other. That is, they do not touch each other. In other embodiments, one or more of the plurality of closed circuits may be in contact with one or more others of the plurality of closed circuits. In some embodiments, the plurality of closed circuits of heating material is arranged concentrically in relation to each other. In other embodiments, the plurality of closed circuits of heating material may be formed so that each of the closed circuits is outside of each other of the closed circuits, or in any other arrangement.

Figure 10:
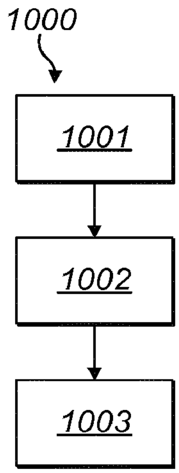
FIG. 10 is a flow diagram showing an example of a method of manufacturing a magnetic field generator for use in apparatus for heating smokable material to volatilize at least one component of the smokable material.

Referring to FIG. 10 there is shown a flow diagram showing an example of a method of manufacturing a magnetic field generator for use in apparatus for heating smokable material to volatilize at least one component of the smokable material, in accordance with an embodiment of the present disclosure.

Broadly speaking, the method 1000 of this embodiment comprises providing 1001 a support, forming 1002 an electrically conductive coil on the support, wherein the forming comprises depositing electrically conductive material on the support, so that the electrically conductive material bonds to the support, and electrically connecting 1003 the coil to a device for passing a varying electrical current through the coil. However, in other embodiments, 1001 and/or 1003 may be omitted.

In one embodiment, the support is non-electrically conductive. That is, support is an electrical insulator. However, in some embodiments, bonding of the electrically conductive material to the support may be omitted.

As noted above, the forming comprises depositing electrically conductive material. In some embodiments, the depositing results in the formation of the coil. In other embodiments, this may not be the case. For example, a film of electrically conductive material may be deposited, and then the coil may be formed from the film, for example by etching the film. In some embodiments, the forming 1002 may comprise forming a plurality of electrically conductive coils, wherein the forming comprises depositing electrically conductive material. In some embodiments the forming 1002 may comprise forming two coils, but in other embodiments the number of coils formed may be three of more. In some embodiments, the plurality of coils may have identical geometries. In other embodiments, the coils may have different geometries. In some embodiments, some or all of the coils occupy differently-sized areas on the substrate.

In some embodiments, the connecting 1003 may comprise connecting each of the plurality of coils to a device for passing a varying electrical current through the electrically conductive coils. In some embodiments, the connecting 1003 may comprise connecting each of coils to a respective device for passing a varying electrical current through the electrically conductive coil connected to that device.

In each of the above-discussed embodiments, the film comprising heating material 10 is deposited in a method comprising printing. However, in other embodiments, the film could be deposited by a different method, such as sputtering, evaporation, chemical vapor deposition, molecular beam epitaxy, electroplating, screen printing, laser etching, drying, firing, curing, and the like.

In each of the above-discussed embodiments, the film defining the coil 50 of electrically conductive material is deposited in a method comprising printing. However, in other embodiments, the film could be deposited by a different method, such as sputtering, evaporation, chemical vapor deposition, molecular beam epitaxy, electroplating, screen printing, laser etching, drying, firing, curing, and the like.

In each of the embodiments discussed above, the heating material 10 may have a skin depth, which is an exterior zone within which most of an induced electrical current and/or induced reorientation of magnetic dipoles occurs. By providing that the component comprising the heating material 10 has a relatively small thickness, a greater proportion of the heating material 10 may be heatable by a given varying magnetic field, as compared to heating material in a component having a depth or thickness that is relatively large as compared to the other dimensions of the component. Thus, a more efficient use of material is achieved. In turn, costs are reduced.

In some embodiments, a component comprising the heating material 10 may comprise discontinuities or holes therein. Such discontinuities or holes may act as thermal breaks to control the degree to which different regions of the smokable material are heated in use. Areas of the heating material 10 with discontinuities or holes therein may be heated to a lesser extent that areas without discontinuities or holes. This may help progressive heating of the smokable material, and thus progressive generation of vapor, to be achieved. Such discontinuities or holes may, on the other hand, be used to optimize the creation of complex eddy currents in use.

In each of the above described embodiments, the smokable material comprises tobacco. However, in respective variations to each of these embodiments, the smokable material may consist of tobacco, may consist substantially entirely of tobacco, may comprise tobacco and smokable material other than tobacco, may comprise smokable material other than tobacco, or may be free of tobacco. In some embodiments, the smokable material may comprise a vapor or aerosol forming agent or a humectant, such as glycerol, propylene glycol, triacetin, or diethylene glycol.

An article embodying the present disclosure may be a cartridge, for example.

In each of the above described embodiments, the article 1, 2 is a consumable article. Once all, or substantially all, of the volatilizable component(s) of the smokable material of the article 1, 2 has/have been spent, the user may dispose of the article 1, 2. The user may subsequently re-use the apparatus with another of the articles 1, 2. However, in other respective embodiments, the article 1, 2 may be non-consumable, and the apparatus and the article 1, 2 may be disposed of together once the volatilizable component(s) of the smokable material has/have been spent.

In some embodiments, an article 1, 2 as discussed above is sold, supplied or otherwise provided separately from apparatus 100, with which it is usable. However in some embodiments, the apparatus 100 and one or more of the articles 1, 2 may be provided together as a system, such as a kit or an assembly, possibly with additional components, such as cleaning utensils.

The disclosure could be implemented in a system comprising any one of the articles discussed herein, and any one of the apparatuses discussed herein, wherein the apparatus itself has heating material, such as in a susceptor, for heating by penetration with the varying magnetic field generated by the magnetic field generator. Heat generated in the heating material of the apparatus could be transferred to the article to heat, or further heat, the smokable material therein when the portion of the article is in the recess 101.

In order to address various issues and advance the art, the entirety of this disclosure shows by way of illustration and example various embodiments in which the claimed invention may be practiced and which provide for superior apparatus for heating smokable material to volatilize at least one component of the smokable material, superior articles for use with such apparatus, superior systems comprising such articles and such apparatus, superior methods of manufacturing magnetic field generators for use in such apparatuses, and superior methods of manufacturing heaters for use in heating smokable material. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. A method of manufacturing a magnetic field generator for use in apparatus for heating smokable material to volatilise at least one component of the smokable material, the method comprising:

providing a support;

forming an electrically conductive coil on the support, wherein the forming comprises printing electrically conductive material on the support; and connecting the electrically conductive coil to a device arranged to provide an alternating magnetic current.

2. The method of claim 1, wherein the forming comprises depositing the electrically conductive coil on the support.

3. The method of claim 1, wherein the forming comprises forming the electrically conductive coil on the support so that the electrically conductive material bonds to the support.

4. The method of claim 1, comprising:

forming a plurality of electrically conductive coils; and connecting each of the plurality of electrically conductive coils to a device for passing a varying electrical current through the electrically conductive coils.

* * * * *